US011086752B2

(12) United States Patent
Ramanath (10) Patent No.: US 11,086,752 B2
(45) Date of Patent: Aug. 10, 2021

(54) METHODS, SYSTEMS, AND COMPUTER READABLE MEDIA FOR VENDOR-NEUTRAL TESTING AND SCORING OF SYSTEMS UNDER TEST (71) Applicant: KEYSIGHT TECHNOLOGIES SINGAPORE (SALES) PTE. LTD., Singapore (SG)

(72) Inventor: Avinash Ramanath, Valencia, CA (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 1312 days.

(21) Appl. No.: 14/838,335

(22) Filed: Aug. 27, 2015

(65) Prior Publication Data
US 2017/0060720 A1    Mar. 2, 2017

(51) Int. Cl.
*G06F 11/34* (2006.01)
*H04L 12/26* (2006.01)
*H04L 12/24* (2006.01)

(52) U.S. Cl.
CPC ...... *G06F 11/3495* (2013.01); *G06F 11/3433* (2013.01); *H04L 43/50* (2013.01); *H04L 41/12* (2013.01)

(58) Field of Classification Search
CPC .. G06F 11/3495; G06F 11/3433; H04L 43/50; H04L 41/12
See application file for complete search history.

(56) References Cited

U.S. PATENT DOCUMENTS

| 8,689,224 | B2* | 4/2014 | Hotra | G06F 21/51 710/6 |
| 8,826,274 | B2* | 9/2014 | Moriki | G06F 11/3419 718/1 |
| 10,606,726 | B2 | 3/2020 | Arora et al. | |
| 2005/0128943 | A1 | 6/2005 | Gibbs et al. | |
| 2005/0265321 | A1 | 12/2005 | Rappaport et al. | |
| 2006/0233111 | A1 | 10/2006 | Wright | |
| 2007/0198881 | A1 | 8/2007 | Volkerink et al. | |
| 2012/0029898 | A1* | 2/2012 | Carroll | H04L 41/145 703/20 |
| 2012/0072968 | A1* | 3/2012 | Wysopal | G06F 11/3612 726/1 |
| 2013/0085769 | A1 | 4/2013 | Jost et al. | |

(Continued)

OTHER PUBLICATIONS

Non-Final Office Action for U.S. Appl. No. 14/462,068 (dated Mar. 2, 2017).

(Continued)

*Primary Examiner* — Regis J Betsch
*Assistant Examiner* — Jeremy A Delozier (57) ABSTRACT

The subject matter described herein relates to vendor-neutral testing and scoring of a system under test. One method for vendor-neutral scoring of a system under test includes generating a pre-testing snapshot of a system under test. The method further includes executing vendor-neutral testing of plural different subsystems of the system under test. The method further includes generating a vendor-neutral score based on the testing. The method further includes generating a post-testing snapshot of the system under test.

21 Claims, 5 Drawing Sheets

(56) References Cited

U.S. PATENT DOCUMENTS

| | | | |
|---|---|---|---|
| 2014/0215487 A1* | 7/2014 | Cherkasova | G06F 9/5083 718/106 |
| 2014/0351412 A1* | 11/2014 | Elisha | H04L 41/0806 709/224 |
| 2015/0006966 A1* | 1/2015 | Dimitrovich | G06F 11/3688 714/38.14 |
| 2015/0051872 A1* | 2/2015 | Arora | G06F 11/3428 702/186 |
| 2017/0322827 A1* | 11/2017 | Little | G06F 3/0619 |

OTHER PUBLICATIONS

Lounibos, "Performance Testing From the Cloud," Technology Innovation Management Review, https://timreview.ca/article/343, pp. 1-6 (Apr. 2010).

Final Office Action for U.S. Appl. No. 14/462,068 (dated Sep. 25, 2017).

Notice of Panel Decision from Pre-Appeal Brief Review for U.S. Appl. No. 14/462,068 (dated Apr. 20, 2018).

"VMware VMmark® Benchmarking Guide," VMmark 2.5.2, http://www.vmware.com/products/vmmark/, pp. 1-188 (Feb. 5, 2014).

Henning, "SPEC CPU2006 Benchmark Descriptions," pp. 1-17 (2006).

Stopp et al., "Methodology for IP Multicast Benchmarking," RFC 3918, pp. 1-31 (Oct. 2004).

Mandeville et al., "Benchmarking Methodology for LAN Switching Devices," RFC 2889, pp. 1-35 (Aug. 2000).

Bradner et al., "Benchmarking Methodology for Network Interconnect Devices," RFC 2544, pp. 1-31 (Mar. 1999).

Advisory Action for U.S. Appl. No. 14/462,068 (dated Jan. 26, 2018).

Examiner's Answer for U.S. Appl. No. 14/462,068 (dated Sep. 28, 2018).

Notice of Allowance and Fee(s) Due for U.S. Appl. No. 14/462,068 (dated Jan. 3, 2020).

Decision on Appeal for U.S. Appl. No. 14/462,068 (Oct. 21, 2019).

* cited by examiner

METHODS, SYSTEMS, AND COMPUTER READABLE MEDIA FOR VENDOR-NEUTRAL TESTING AND SCORING OF SYSTEMS UNDER TEST

TECHNICAL FIELD

The subject matter described herein relates to testing of network and data center devices and systems. More particularly, the subject matter described herein relates to methods, systems, and computer readable media for vendor-neutral testing and scoring of systems under test.

BACKGROUND

When evaluating network and data center equipment and systems, it is desirable to test their performance under various conditions. For example, it may be desirable to test the CPU performance of a server farm by loading CPU intensive applications on the server farm and monitoring response times of the servers under different CPU loading conditions. In another example, it may be desirable to test network or disk I/O performance of devices under test. In networks where virtualization is used, it may be desirable to test virtual machine (VM) deployment time, VM processing performance and inter-VM switching performance.

Network and data center equipment vendors test their products before making their products available to network and data center service providers. Service providers who purchase or are considering purchasing network equipment may desire a way to evaluate equipment from different equipment vendors. Because each vendor runs its own tests, service providers do not have a vendor-neutral way to compare the performance of systems from different vendors.

Accordingly, there exists a long felt need for methods, systems, and computer readable media for vendor-neutral testing and scoring of devices and systems under test.

SUMMARY

The subject matter described herein relates to vendor-neutral testing and scoring of a system under test. One method for vendor-neutral testing and scoring of a system under test includes generating a pre-testing snapshot of a system under test. The method further includes executing vendor-neutral testing of plural different subsystems of the system under test. The method further includes generating a vendor-neutral score based on the testing. The method further includes generating a post-testing snapshot of the system under test.

The terms "vendor-neutral testing" and "vendor-neutral scoring" refer to testing and scoring that are designed to be used to evaluate and compare systems from different equipment vendors. However, the subject matter described herein is not limited to testing equipment from different vendors. The testing and scoring described herein can be used to evaluate equipment from a single vendor without departing from the scope of the subject matter described herein.

A vendor-neutral score as described herein may be a composite score that includes components or contributions from results of testing of different subsystems of a system under test. For example, the composite score may include contributions from at least two of: CPU testing, I/O testing, and VM testing.

If the testing involves testing of physical (e.g. CPU) and virtual (e.g. VMs and hypervisor) components of the system under test, the composite score will reflect the combined performance of the physical and virtual components. Such a physical/virtual composite score may assist service providers in evaluation combinations of physical and virtual components from different vendors.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
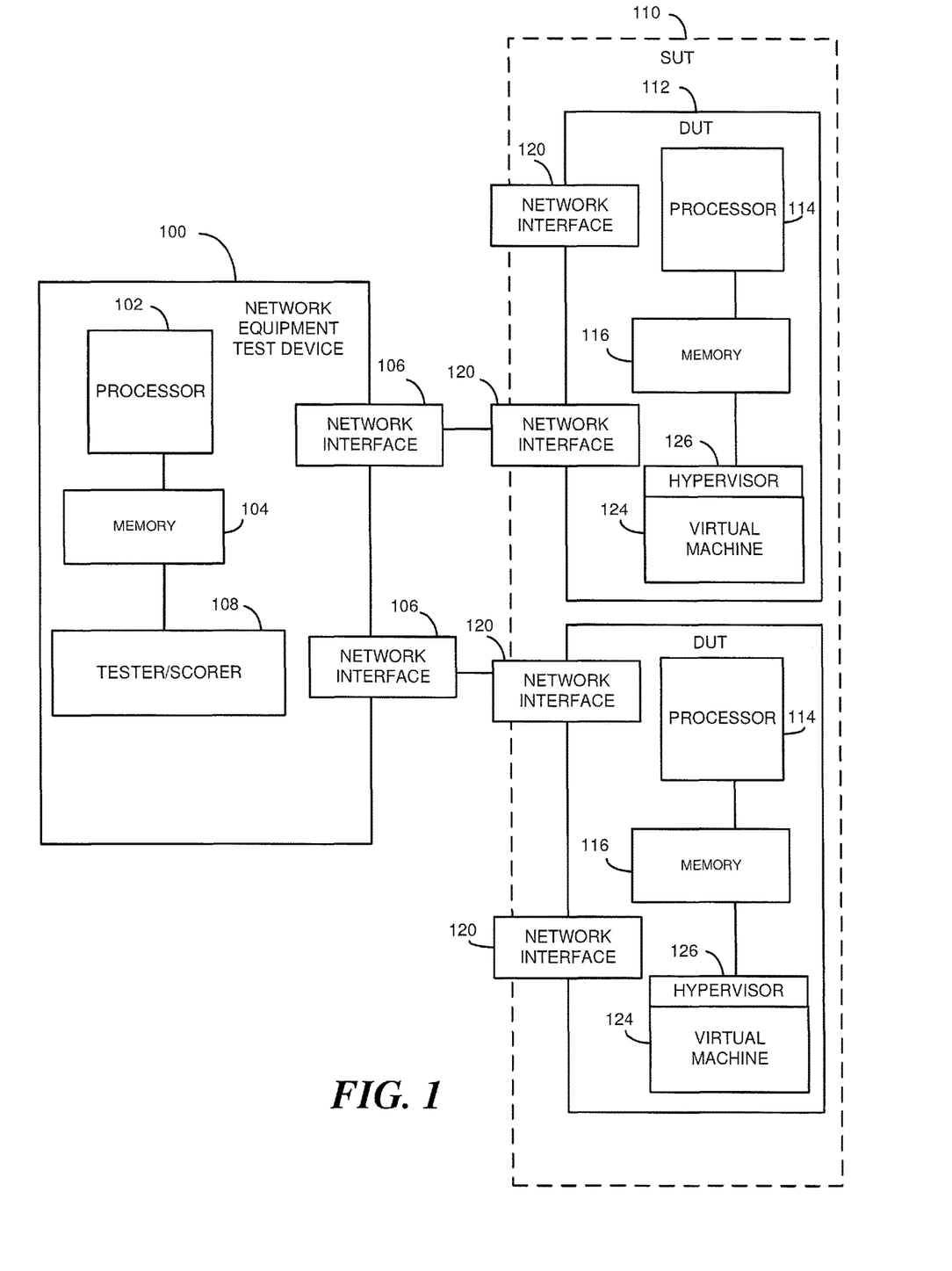
FIG. 1 is a block diagram illustrating an exemplary network equipment test device and a system under test for vendor-neutral testing and scoring of a system under test.

The subject matter described herein relates to vendor-neutral testing and scoring of a system under test. FIG. 1 is a block diagram illustrating an exemplary system for vendor-neutral testing and scoring of a system under test. Referring to FIG. 1, a network equipment test device 100 includes at least one processor 102, memory 104, and network interfaces 106. Network equipment test device 100 also includes a vendor-neutral tester/scorer 108 that implements vendor-neutral equipment testing and scoring as described herein. Tester/scorer 108 may be implemented by or on processor 102. Network equipment test device 100 may be a special purpose computing platform that generates simulated network traffic to and monitors performance of a system under test 110.

System under test 110 may include one or more devices under test 112, where each device under test also includes a processor 114, memory 116, and network interfaces 120. Each device under test 112 may also host one or more virtual machines 124 that execute on hypervisors 126. In one example, each device under test 112 may be a server in a server farm that performs a processing or other computing related function. Specific examples of devices under test 112 include file servers, web servers, mappers, reducers, search engines, social networking servers, etc.

Figure 2:
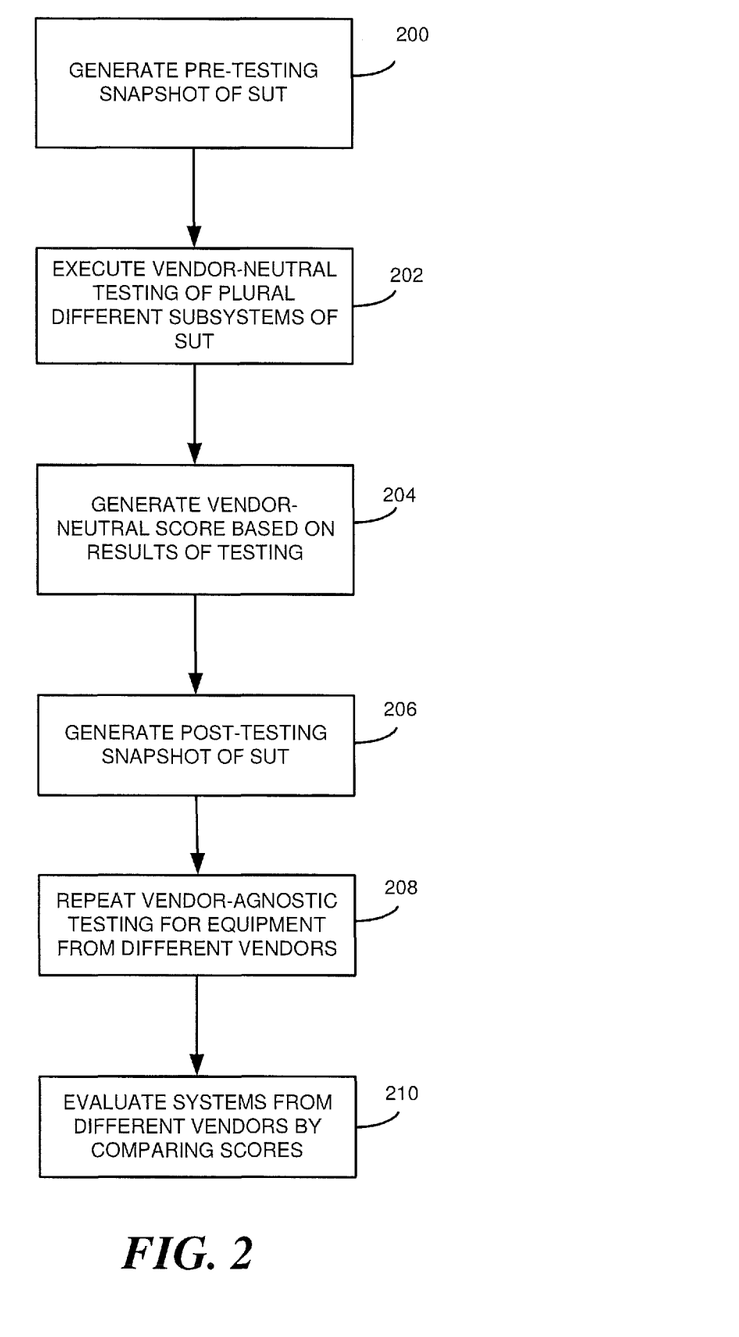
FIG. 2 is a flow chart illustrating an exemplary process for vendor-neutral testing and scoring of a system under test.

In order to evaluate the performance of systems under test from different vendors, it is desirable to perform vendor-neutral testing and scoring of systems under test. FIG. 2 is a flow chart illustrating an exemplary process for vendor-neutral testing and scoring of a system under test according to an embodiment of the subject matter described herein. Referring to FIG. 2, in step 200, a pre-testing snapshot of a system under test is generated. For example, tester/scorer 108 may record the state of system under test 110 prior to executing one or more tests of system under test 110. Examples of information items that may be recorded as a snapshot include hardware type, operating system, hypervisor type, available volatile and non-volatile memory, types and number of VMs deployed, etc.

In step 202, vendor-neutral testing of plural different subsystems of the system under test is executed. For example, vendor-neutral tester/scorer 108 may execute two or more of a CPU performance test, a disk I/O test, a network I/O test, a VM related test, and a big data infrastructure test. Specific examples of different tests will be provided below.

In step 204, a vendor-neutral score is generated based on results of the testing. For example, tester/scorer 108 may assign a point value to the results of each test. Table 1 shown below illustrates an example of a vendor-neutral scoring method for scoring systems under test from different vendors.

TABLE 1

Vendor-Neutral Scoring

| Test | Maximum Score | Vendor A Score | Vendor B Score |
|---|---|---|---|
| CPU Perf | 5 | 5 | 3 |
| VM Tests | 5 | 4 | 1 |
| Disk I/O | 5 | 3 | 2 |
| NW I/O | 5 | 3 | 4 |
| Big Data | 5 | 2 | 5 |
| TOTAL | 25 | 17 | 15 |

In Table 1, each type of test is assigned a number of maximum possible points. In each test, the better the performance, the higher the score. For example, for the CPU performance test, if a particular vendor's equipment completes the entire workload for a test without error in the time allocated for the test, the equipment may be awarded a 5 of 5 possible points for the particular test. If the equipment finishes only 80% of the workload within the allocated time period, the equipment may be scored 4 of 5 possible points. Similar scoring methods may be used for each test.

Scores are shown for two different vendors for each test. The total score for the two different vendors can be compared to evaluate the overall performance of systems under tests from different vendors. In the illustrated example, the score for Vendor A is 17 out of 25 possible points and the score for Vendor B is 15 out of 25 possible points, indicating that Vendor B's equipment has a better overall performance score. Using such a scoring system, a network or data center service provider can evaluate and compare systems under test from different vendors.

As illustrated in Table 1, the Total of each column is a composite score including contributions from CPU performance test results, network I/O test results, disk I/O test results, and big data simulation test results. Generating such a composite score based on any combination of two or more of these test categories is intended to be within the scope of the subject matter described herein.

In one embodiment, the score may include a VM certification component indicating successful completion of one or more VM certification tests. Such a VM certification can be used to evaluate VM and/or hypervisor performance across different VM or hypervisor vendors.

Returning to FIG. 2, in step 206, a post-testing snapshot of the system under test is generated. Step 206 may be performed by tester/scorer 108 to record the state of system under test 110 after testing. The snapshot items recorded may be the same as those in step 200. The pre- and post-testing snapshots may be compared to ensure that the state of system under test 110 is consistent or at least known for successive testing iterations. The snapshots may help vendors to reproduce and fix any issues with their servers. For example, if the default options for a hypervisor are not configured for high performance, vendors can use the pre and post-testing snapshots to reconfigure default hypervisor parameters to the advantage of their customers. Hence, the vendor neutral scoring provides a way for vendors to improve their systems and re-submit their system towards re-scoring efforts.

In step 208, the testing may be repeated for equipment or systems from different vendors. Repeating the tests may include performing steps 200 through 206 for a system under test from another vendor. The result of repeating the testing is another score, such as the score for Vendor B in Table 1. In step 210, systems from different vendors are evaluated by comparing their vendor neutral scores. Using the example in Table 1 above, the systems from Vendors A and B can be compared by comparing their total performance scores. Specific examples of tests that may be performed as part of the vendor-neutral testing will now be described.

Figure 3:
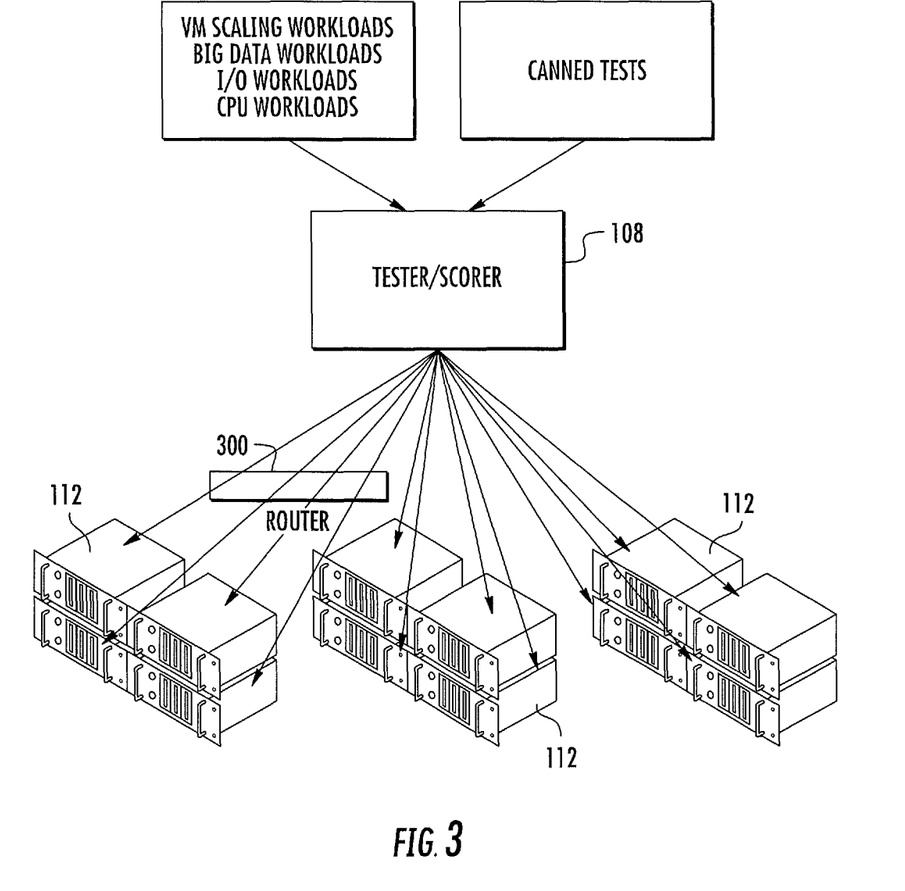
FIG. 3 is a network diagram illustrating exemplary testing and scoring of plural devices under test.

FIG. 3 is a network diagram illustrating exemplary tests that can be implemented by tester/scorer 108 to test devices under test 112. In FIG. 3, devices under test 112 may be servers accessible by tester/scorer 108 via a router 300. Devices under test 112 may be devices from different vendors or devices from the same vendor. The testing of devices under test 112 may be implemented serially or in parallel. In the illustrated example, tests such as VM scaling workloads, big data workloads, I/O workloads, and CPU workloads may implemented by tester/scorer 108 to test each device under test 112. At least some of the tests may include user configurable parameters. For example, for a VM scaling workload, the user or test system operator may select configure the number of VMs to be deployed on each device under test 112 and the desired rate of VM deployment. In addition, tester/scorer 108 may implement canned tests, such as standards-based tests that test devices under test 112 according to an industry standard. One example of a standards-based test that may be implemented is the Standard Performance Evaluation Corporation (SPEC) CPU 2006 test.

Figure 4:
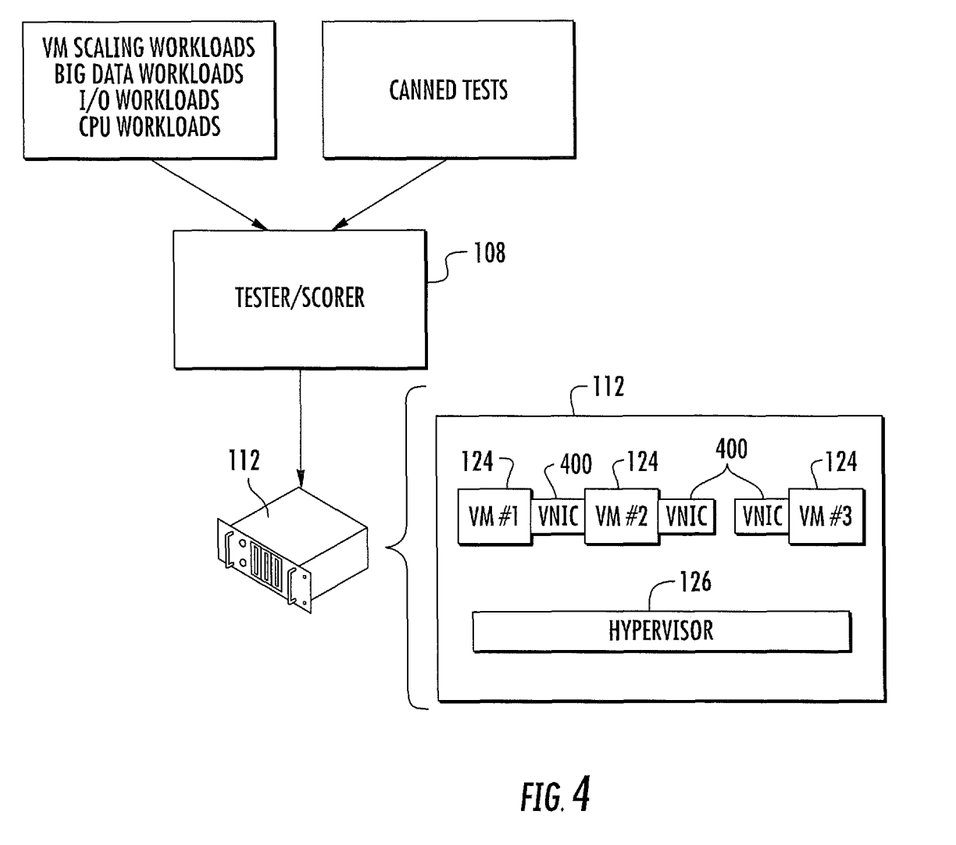
FIG. 4 is a network diagram illustrating exemplary testing and scoring of virtual machine performance on a device under test.

In one example, a VM scaling test may be executed where tester/scorer 108 instructs each device 112 to create a large number of VMs and monitors the VM creation times of each device 112. Another VM related test that may be implemented is the simulation of network traffic between VMs to test the network performance between VMs located on the same or different servers. This test is illustrated in more detail in FIG. 4. In FIG. 4, tester/scorer 108 may send simulated traffic to VMs 124 that is configured to be routed or switched between VMs 124 on device under test 112. Simulated traffic may include any network protocol traffic tailored to test performance and/or functionality of a device under test. For example, if the device under test is a web server, a firewall, a router, or other device that handles web traffic, the simulated traffic may be simulated HTTP or FTP traffic that emulates web traffic patterns, such as video browsing, file transfers via FTP, etc. In another example, the simulated traffic may include simulated wireless protocol traffic. For example, the simulated traffic can emulate control plane commands using extended GPRS tunneling protocol (eGTP). In the VM test illustrated in FIG. 4, tester/scorer 108 may verify that the traffic is correctly switched or routed based on how the traffic is addressed and may also monitor the routing or switching time. Such a test may characterize the network I/O performance of VMs 124 and virtual network interface cards (VNICs) 400 associated with each VM.

Performance metrics associated with the VM scaling test that may be monitored by tester/scorer 108 include: time for creating VM by a hypervisor in a serial fashion to determine whether there is a degradation in performance over time, time for creating multiple VMs by the hypervisor in a parallel fashion, whether advertised VM creation times by a vendor match or vary from the actual time of creation.

Figure 5:
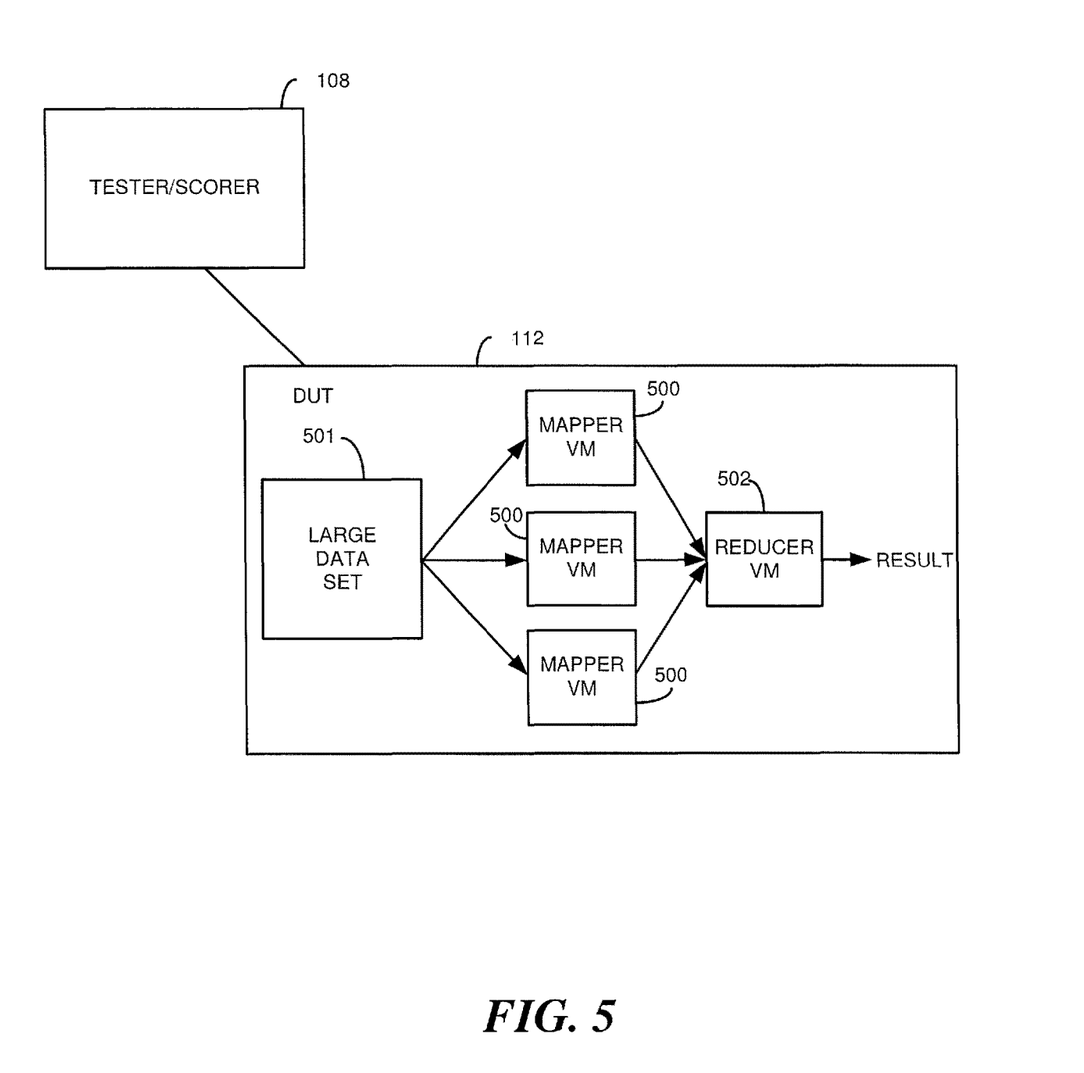
FIG. 5 is a block diagram illustrating an exemplary map-reduce test that may be used to evaluate performance of a system under test.

In another example, tester/scorer 108 may simulate a big data workload. One example of a big data workload that may be simulated by tester/scorer 108 is a map-reduce problem. In a map-reduce problem, a large data set, such as all of the words in a book or a social media friend graph is divided among nodes referred to as mappers. The mappers load smaller portions of the data set in memory and perform the requested processing on the subset of the large data set. Nodes that are referred to as reducers aggregate the results from the different mappers to produce an aggregate result, such as the word count for each word in a book. In FIG. 5, tester/scorer 108 may instruct device under test 112 to instantiate mapper VMs 500, each of which receives a portion of a large data set 501 and a processing task associated with the data set. Tester/scorer 108 may also instantiate one or more reducer VMs 502 to aggregate the results from the mappers 500. Tester/scorer 108 may then instruct mappers 500 to perform the requested processing task and monitor the time that it takes the mappers 500 and reducer 502 to produce the desired result.

Continuing with the word count example, tester/scorer 108 may divide a text or other file that represents a book among mapper VMs 500. Each mapper VM 500 may generate a set of words and counts of occurrences of each word. Reducer VM 502 may aggregate the counts generated by mapper VMs 500 into a single word list and associated word counts. Tester/scorer 108 may record the total time required to generate the final word list with the word counts and the number of mapper and reducer VMs used to generate the counts and generate a score based on the completion time. Such a test may be executed using hardware, VMs, and hypervisors from different vendors to identify the relative performance of the different vendors' products.

As stated above, other examples of tests that may be performed or instantiated by tester/scorer 108 are network and disk I/O based tests and CPU tests. I/O tests may be run that span multiple VMs and that are executed within VMs in parallel to measure the performance of hypervisors in such environments. CPU bound tests may be run across VMs to see how the hypervisors behave under loaded conditions. Metrics can be used to generate scores based on baseline performance levels depending on hypervisor type, processor type, memory module types, etc. In one embodiment, tester/scorer 108 may produce a certification score for VM performance that allow VM vendors to advertise that they are certified according to the vendor-neutral testing described herein.

As stated above, one VM performance test that may be performed is a VM scaling test. Examples of VM scaling tests that can be performed include ramping the number of VMs to a certain level, such as exponentially, linearly, or otherwise increasing the number of the VMs that are being deployed, and monitoring the VM deployment times of different systems under test.

An example of an I/O bound test that can be performed is a server message block (SMB) protocol test. SMB is an application layer network protocol used for shared access to resources, such as files, printers, and serial ports. In order to perform an SMB test, tester/scorer 108 may instantiate VMs on devices under test 112, where each VM supports the SMB protocol. Tester/scorer 108 may then perform a file I/O test by accessing files in the file system shared by the VMs using the SMB protocol and monitor I/O response time. Tester/scorer 108 may generate a score based on the I/O response times. The test engineer may repeat the SMB file I/O test across equipment and/or VMs from different vendors to determine the equipment/VM combination with the best SMB performance.

An example of a CPU test that can be performed is the above-referenced SPEC CPU 2006 test or other CPU performance benchmarking test. The SPEC CPU 2006 test involves loading the CPU with various standard workloads, such as file compression and decompression, email to HTML conversion, etc., and monitoring CPU performance. As part of generating the composite vendor-neutral score, tester/scorer 108 may load each device under test 112 with the necessary applications to implement the SPEC CPU 2006 test, monitor the CPU performance, and generate a score for the performance that will be included in the composite score.

The subject matter described herein is not limited to using the SPEC CPU 2006 test to evaluate CPU performance. Any suitable test where a CPU is loaded with a workload and performance is monitored is intended to be within the scope of the subject matter described herein. For example, a CPU performance test may include loading a CPU with a processor-intensive application, such as an image processing application, loading a script that instructs the CPU to perform a task using the application, such as compressing an image file, monitoring CPU performance, and generating a score or score component based on the performance.

The CPU tests described herein may be executed by individual processors or processor cores or in parallel across multiple processors or processor cores.

Thus, the subject matter described herein improves the technological field of network equipment testing by providing a testing and scoring system that rates equipment, such as servers and data center environments from different vendors. The test system may provide a suite of tests that are packaged together and that help in assessing the performance of a system under test. Workloads can be simulated across multiple servers in a coordinated manner. Analytics may also be presented across multiple servers. The scoring may be used to rank systems from different vendors. Workloads may be coordinated to determine performance under different conditions. Canned workloads may reduce the time used to implement testing. Tester/scorer 108 may also generate statistics to show how systems perform over time. For example, for systems that run for long periods of time, e.g., weeks, months, or years, tester/scorer 108 may periodically test the system over its operational lifetime and generate scores at different times. Using the score and time information, an operator can quantify how the system performs over time. For example, tester/scorer 108 may output an indication, such as a graph of the score versus time so that the operator can easily view how the score changes over time.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for vendor-neutral testing and scoring of a system under test, the method comprising:
    generating a pretesting snapshot of the system under test, wherein the system under test includes network or data center equipment including at least one server that performs a processing or computing function, the at least one server comprising a file server, a web server, a mapper, a reducer, a search engine, or a social networking server;
    executing vendor-neutral testing of plural different subsystems of the system under test, wherein executing vendor-neutral testing of plural different subsystems of the system under test includes executing a virtual machine (VM) test and at least one of: a central processing unit (CPU) performance test, an input/output (I/O), and a big data infrastructure test, wherein executing the VM test includes executing a VM scaling test where the system under test is instructed to instantiate a plurality of VMs on the system under test by ramping a number of VMs on the system under test to a predetermined level and the response time of the system under test to instantiate the virtual machines on the system under test is monitored, wherein the system under test includes a hypervisor and executing the VM scaling test includes:
        instructing the hypervisor to serially increase the number VMs to the predetermined level and determining whether there is a degradation in VM instantiation performance over time; and
        instructing the hypervisor to increase the number of VMs to the predetermined level in parallel and monitoring the response time includes monitoring a time for the hypervisor to increase the number of VMs to the predetermined level serially and in parallel and wherein the method further comprises:
    generating a vendor-neutral score based on results of the testing; and
    generating a post-testing snapshot of the system under test.

2. The method of claim 1 wherein generating a pre-testing snapshot of the system under test includes recording hardware, software, and virtual machine configurations of the system under test prior to executing the testing.

3. The method of claim 1 wherein generating a vendor-neutral score based on results of the testing includes assigning point values to each of the tests and generating the score based on the point values.

4. The method of claim 1 wherein executing a VM test includes sending simulated traffic between VMs and monitoring switching of the simulated traffic between the VMs.

5. The method of claim 1 wherein executing an I/O test includes executing an I/O test that spans plural VMs.

6. The method of claim 1 wherein executing an I/O test includes executing at least one of a disk I/O test and a network I/O test.

7. The method of claim 1 wherein executing a big data infrastructure test includes executing a map-reduce test.

8. The method of claim 1 wherein executing the vendor-neutral testing includes testing at least one physical component of the system under test and at least one virtual component of the system under test and wherein generating the vendor-neutral score includes generating a composite score that includes contributions from results of the testing of the at least one physical component and the at least one virtual component.

9. The method of claim 1 comprising repeating the vendor-neutral testing at different times of operation of the system under test, recording the vendor-neutral score at each time, and outputting an indication of how the vendor-neutral scores change over time.

10. A system for vendor-neutral testing and scoring of a system under test, the system comprising:
    a network equipment test device including at least one processor;
    a tester/scorer implemented by the at least one processor and configured for:
        generating a pretesting snapshot of the system under test, wherein the system under test includes network or data center equipment including at least one server that performs a processing or computing function, the at least one server comprising a file server, a web server, a mapper, a reducer, a search engine, or a social networking server;
        executing vendor-neutral testing of plural different subsystems of the system under test, wherein executing vendor-neutral testing of plural different subsystems of the system under test includes executing a virtual machine (VM) test and at least one of: a central processing unit (CPU) performance test, an input/output (I/O), and a big data infrastructure test, wherein executing the VM test includes executing a VM scaling test where the system under test is instructed to instantiate a plurality of VMs on the system under test by ramping a number of VMs on the system under test to a predetermined level and the response time of the system under test to instantiate the virtual machines on the system under test is monitored, wherein the system under test includes a hypervisor and executing the VM scaling test includes:
            instructing the hypervisor to serially increase the number of VMs to the predetermined level and determining whether there is a degradation in VM instantiation performance over time; and
            instructing the hypervisor to increase the number of VMs to the predetermined level in parallel and monitoring the response time includes monitoring a time for the hypervisor to increase the number of VMs to the predetermined level serially and in parallel and wherein the tester/scorer is further configured for:
        generating a vendor-neutral score based on results of the testing; and
        generating a post testing snapshot of the system under test.

11. The system of claim 10 wherein generating a pre-testing snapshot of the system under test includes recording hardware, software, and virtual machine configurations of the system under test prior to executing the testing.

12. The system of claim 10 wherein generating a vendor-neutral score based on results of the testing includes assigning point values to each of the tests and generating the score based on the point values.

13. The system of claim 10 wherein executing a VM test includes sending simulated traffic between VMs and monitoring switching of the simulated traffic between the VMs.

14. The system of claim 10 wherein executing an I/O test includes executing an I/O test that spans plural VMs.

15. The system of claim 10 wherein executing an I/O test includes executing at least one of a disk I/O test and a network I/O test.

16. The system of claim 10 wherein executing a big data infrastructure test includes executing a map-reduce test.

17. The system of claim 10 wherein the network equipment test device comprises a simulation platform for sending simulated network traffic to the system under test.

18. The system of claim 10 wherein the score includes a virtual machine (VM) certification component indicating successful completion of at least one VM certification test.

19. The system of claim 10 wherein executing the vendor-neutral testing includes testing at least one physical component of the system under test and at least one virtual component of the system under test and wherein generating the vendor-neutral score includes generating a composite score that includes contributions from results of the testing of the at least one physical component and the at least one virtual component.

20. The system of claim 10 comprising repeating the vendor-neutral testing at different times of operation of the system under test, recording the vendor-neutral score at each time, and outputting an indication of how the vendor-neutral scores change over time.

21. A non-transitory computer readable medium having stored thereon executable instructions that when executed by the processor of a computer control the computer to perform steps comprising:

generating a pretesting snapshot of the system under test, wherein the system under test includes network or data center equipment including at least one server that performs a processing or computing function, the at least one server comprising a file server, a web server, a mapper, a reducer, a search engine, or a social networking server;

executing vendor-neutral testing of plural different subsystems of the system under test, wherein executing vendor-neutral testing of plural different subsystems of the system under test includes executing a virtual machine (VM) test and at least one of: a central processing unit (CPU) performance test, an input/output (I/O), and a big data infrastructure test, wherein executing the VM test includes executing a VM scaling test where the system under test is instructed to instantiate a plurality of VMs on the system under test by ramping a number of VMs on the system under test to a predetermined level and the response time of the system under test to instantiate the virtual machines on the system under test is monitored, wherein the system under test includes a hypervisor and executing the VM scaling test includes:

instructing the hypervisor to serially increase the number of VMs to the predetermined level and determining whether there is a degradation in VM instantiation performance over time; and instructing the hypervisor to increase the number of VMs to the predetermined level in parallel and monitoring the response time includes monitoring a time for the hypervisor to increase the number of VMs to the predetermined level serially and in parallel and wherein the steps further comprise:

generating a vendor-neutral score based on results of the testing; and generating a post testing snapshot of the system under test.

* * * * *